No. 765,576.

Patented July 19, 1904.

UNITED STATES PATENT OFFICE.

OTTO J. GRAUL, OF LUDWIGSHAFEN-ON-THE-RHINE, GERMANY, ASSIGNOR TO BADISCHE ANILIN UND SODA FABRIK, OF LUDWIGSHAFEN-ON-THE RHINE, GERMANY, A CORPORATION OF BADEN.

PROCESS OF MAKING OMEGA CYANMETHYL-ANTHRANILIC ACID.

SPECIFICATION forming part of Letters Patent No. 765,576, dated July 19, 1904.

Application filed August 11, 1903. Serial No. 169,150. (No specimens.)

*To all whom it may concern:*

Be it known that I, OTTO J. GRAUL, doctor of philosophy and chemist, a subject of the Duke of Anhalt, residing at Ludwigshafen-on-the-Rhine, in the Kingdom of Bavaria, Empire of Germany, have invented new and useful Improvements in Processes of Making Omega Cyanmethyl-Anthranilic Acid, of which the following is a specification.

By condensing together anthranilic acid and formaldehyde under appropriate conditions there results a body apparently dependent on the union of equal molecular proportions of anthranilic acid and formaldehyde, but which probably does not possess the accepted constitution of the ordinary so-called "Schiff" bases—that is to say,

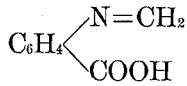

since it does not dissolve in dilute caustic-soda or dilute carbonate-of-soda solution (containing five per cent. of NaOH or $Na_2CO_3$) and is therefore different from the condensation product of formaldehyde and anthranilic acid described in the specification of Letters Patent No. 718,340, dated January 13, 1903. It appears to be identical with the body obtained by treating anthranilic acid with formaldehyde and hydrocyanic acid, according to the method of v. Miller and Plöchl, as described in the German Patents Nos. 117,924 and 120,105, but in the formation of which body the hydrocyanic acid does not take part. Owing to this apparent lack of chemical affinity for hydrocyanic acid, the aforementioned condensation product has not been used in the manufacture of omega cyanmethyl-anthranilic acid. I have discovered that under suitable conditions this insoluble condensation product can be caused to react with cyanids, as explained in the examples, to form omega cyanmethyl-anthranilic acid. This treatment may either be direct or an intermediate treatment with a sulfite, or bisulfite may, if desired, be interpolated.

The following examples will serve to further illustrate the nature of my invention, which, however, is not confined to these examples. The parts are by weight.

*Example 1—Preparation of an Insoluble Condensation Product of Anthranilic Acid and Formaldehyde.*

A. *In aqueous solution.*—Rub up together into a paste one hundred and sixty (160) parts of moist anthranilic acid containing eighty-five and six-tenths (85.6) per cent. of pure acid and seventy-nine (79) parts of a technical solution of formaldehyde containing forty (40) per cent. of $CH_2O$. Gently warm the whole for a short time until the reaction is completed. The mixture solidifies, and a product is obtained which is insoluble in carbonate-of-soda solution. If desired, the condensation can be effected at ordinary temperature and with more dilute formaldehyde solutions. It is then desirable to stir the mixture well until the product of the reaction is completely insoluble in dilute carbonate-of-soda or caustic-soda solution containing five (5) per cent. of NaOH or five (5) per cent. of $Na_2CO_3$.

B. *In ethereal solution.*—Dissolve one hundred and thirty-seven (137) parts of anthranilic acid in about one thousand (1,000) parts of boiling ether, and to the warm solution add seventy-nine (79) parts of the technical solution of formaldehyde containing forty (40) per cent. of $CH_2O$. In a short time a part of the product of the reaction separates out in crystalline form. The remainder can be obtained by distilling off the ether.

*Example 2—Conversion of the Condensation Product of Example 1 into Omega Cyanmethyl-Anthranilic Acid.*

A. Dissolve sixty-five (65) parts of potassium cyanid containing one hundred (100) per cent. of KCN in three hundred (300) parts of water, and add to this the quantity of hydrochloric acid necessary to exactly liberate the hydrocyanic acid. Introduce into this solution in the cold the above-mentioned condensation product obtained from one hundred and thirty-seven (137) parts of anthranilic acid. Stir while gently warming on the water-bath until the reaction commences and the whole solidifies.

B. Finely pulverize the condensation product obtained according to Example 1 from one hundred and thirty-seven (137) parts of anthranilic acid and introduce it at ordinary temperature, while stirring, into a solution of sixty-five (65) parts of potassium cyanid containing one hundred (100) per cent. of KCN in three hundred (300) parts of water. Then warm the whole on the boiling-water bath until a clear solution results, which contains the potassium salt of the omega cyanmethyl-anthranilic acid.

Instead of aqueous solutions alcoholic-aqueous solutions can be employed, and instead of potassium cyanid the equivalent quantity of another metallic cyanid can be employed, or the omega-cyanmethylanthranilic acid can be prepared in ethereal solution, in which case the product obtained according to Example 1 (B) can be directly treated with the necessary quantity of hydrocyanic acid and warmed, or anthranilic acid, formaldehyde, and hydrocyanic acid may be brought together in ethereal solution and the whole gently warmed.

*Example 3—Conversion of the Condensation Product of Example 1 into Omega Cyanmethyl-Anthranilic Acid by Means of Sulfite and Cyanid.*

Dissolve two hundred and fifty-five (255) parts of neutral crystallized sodium sulfite in five hundred (500) parts of water. Then while stirring and warming add to this solution the condensation product obtained according to Example 1 from one hundred and thirty-seven (137) parts of anthranilic acid. A clear solution results. Treat the solution so obtained with sixty-five (65) parts of potassium cyanid containing one hundred (100) per cent. of KCN or with the equivalent quantity of another metallic cyanid and heat the whole.

Instead of employing neutral sodium sulfite the equivalent amount of a sodium-bisulfite solution can be employed. In this case the acid body which separates out can be neutralized or not, as desired, and then treated with metallic cyanid.

The results obtained by employing in this Example 3 hydrogen cyanid instead of a metallic cyanid are less favorable.

I claim—

1. The process of manufacturing omega cyanmethyl-anthranilic acid which consists in treating the condensation product of anthranilic acid and formaldehyde, which is insoluble in dilute soda solution, with a sulfite and a cyanid.

2. The process of manufacturing omega cyanmethyl-anthranilic acid which consists in treating the condensation product of anthranilic acid and formaldehyde, which is insoluble in dilute soda solution, with a cyanid.

3. The process of manufacturing omega cyanmethyl-anthranilic acid which consists in treating the condensation product of anthranilic acid and formaldehyde, which is insoluble in dilute soda solution, with hydrogen cyanid.

In testimony whereof I have hereunto set my hand in the presence of two subscribing witnesses.

OTTO J. GRAUL.

Witnesses:
H. W. HARRIS,
BERNHARD C. HESSE.